(12) United States Patent
Jew (10) Patent No.: US 11,187,051 B2
(45) Date of Patent: Nov. 30, 2021

(54) FRACTURE FLUID ALTERATION TO MITIGATE BARITE SCALE PRECIPITATION IN UNCONVENTIONAL OIL/GAS SHALE SYSTEMS

(71) Applicant: The Board of Trustees of the Leland Stanford Junior University, Stanford, CA (US)

(72) Inventor: Adam Jew, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/519,823

(22) Filed: Jul. 23, 2019

(65) Prior Publication Data
US 2020/0048972 A1 Feb. 13, 2020

Related U.S. Application Data

(60) Provisional application No. 62/717,326, filed on Aug. 10, 2018.

(51) Int. Cl.
*E21B 21/06* (2006.01)
*E21B 43/16* (2006.01)
*C09K 8/02* (2006.01)
*E21B 43/26* (2006.01)

(52) U.S. Cl.
CPC .............. *E21B 21/068* (2013.01); *C09K 8/02* (2013.01); *E21B 43/162* (2013.01); *E21B 43/26* (2013.01)

(58) Field of Classification Search
None
See application file for complete search history.

(56) References Cited

U.S. PATENT DOCUMENTS

| 10,179,874 B2 | 1/2019 | Mahmoud et al. |
| 2017/0007325 A1 | 3/2017 | Vidic |
| 2017/0190955 A1* | 7/2017 | Mahmoud ............... E21B 43/26 |

\* cited by examiner

*Primary Examiner* — Jeffrey D Washville
(74) *Attorney, Agent, or Firm* — Lumen Patent Firm (57) ABSTRACT

An acid spearhead formulation for mineral scale reduction that includes a sulfuric acid solution having an acidity that is substantially equivalent to a hydrochloric acid solution in an acid spearhead formulation, a sodium citrate compound, where an acid spearhead formulation for mineral scale reduction is formed, the acid spearhead formulation is disposed in a well bore to stabilize mineral scales, the acid spearhead formulation is disposed in the well bore to chelate solubilized calcium in a rock bed of the well bore, and the well bore includes a temporal thermodynamic subsurface barite cycling having a subsurface barite dissolution temporal phase, a subsurface barite transport to fractures temporal phase, a subsurface barite precipitation to fracture temporal phase and a subsurface barite dissolution to fracture space temporal phase, where the acid spearhead formulation for mineral scale reduction reacts with the well bore within the subsurface barite dissolution temporal phase.

7 Claims, 3 Drawing Sheets

FRACTURE FLUID ALTERATION TO MITIGATE BARITE SCALE PRECIPITATION IN UNCONVENTIONAL OIL/GAS SHALE SYSTEMS

CROSS-REFERENCE TO RELATED APPLICATIONS

This application claims priority from U.S. Provisional Patent Application 62/717,326 filed Aug. 10, 2018, which is incorporated herein by reference.

STATEMENT OF GOVERNMENT SPONSORED SUPPORT

This invention was made with Government support under contract DE-AC02-76SF00515 awarded by the Department of Energy. The Government has certain rights in the invention.

FIELD OF THE INVENTION

The present invention relates generally to hydraulic fracturing. More particularly, the invention relates to a chemical formulation that retains the acidity of injected fluid required to increase the overall permeability of rock during hydraulic fracturing while stabilizing barite (barium sulfate) contained in drilling mud which is released into solution during current stimulation practices resulting in a decrease in newly formed permeability once the released barium and sulfate precipitates in the rock. This new formulation is designed to increase the overall production/recovery of natural gas or crude oil by mitigating permeability reducing barite scale that is common in hydraulic fracturing systems.

BACKGROUND OF THE INVENTION

In unconventional oil/gas extraction, Ba, both in produced water and as barite scale, is a known problem. Over the decades research regarding Ba in conventional and unconventional systems have focused on mitigation of barite scale. In the case of shale, scale damage is particularly deleterious because it occurs in pore spaces and microfractures within the shale matrix, permanently destroying production. By neglecting the source of the Ba in unconventional systems, developing effective new Ba scale mitigation methods becomes more difficult. The main research into the source of Ba in these systems has focused on Ba in formation water and leaching from the shale. It was found that the majority (>60%) of the Ba contained in the rock was inaccessible to chemicals commonly found in hydraulic fracturing system (the majority of Ba required a hydrofluoric acid extraction). Though research indicated that high ionic strength (I.S.) along with reducing conditions can extract Ba from the rock, low pH with lower initial I.S. which occurs at the beginning of fluid injection was not investigated. Other researchers have also tested the leachability of Ba from shale samples and found that a significant amount of Ba in the rock is stable unless extremely harsh chemical extractants not found in unconventional extraction are used. Besides Ba release from the general shale matrix (small barite grains, associated with pyrite, bound to clays, etc.), there is the potential, albeit less probable, Ba release from nearly pure barite nodules/lenses that are sometimes found in shales. Though barite lenses have the potential for providing large quantities of Ba to injected fluids during injection, shut-in, and production, the probability of tapping into these Ba sources across numerous wells in the same play, as well as different plays in order to produce the highly consistent Ba concentrations in produced water, >1000 mg/L Ba, is highly unlikely.

Besides the source rock being a source of Ba in a hydraulic fracturing system, another possible source is drilling mud, which contains barite at concentrations ranging from 20 to 60 wt. %. Though barite laden drilling mud is widely used throughout the conventional and unconventional industries, there has been little research into the stability of the Ba in these materials. The most robust study, from the 1980's, focused on the bioavailability of the overall drilling fluid in conventional systems where the fluid was disposed of directly into the ocean. To date the previous work on drilling mud has focused on conventional oil/gas exploration, which differs significantly from hydraulic fracturing systems where chemicals are injected into the subsurface allowing them to interact/react with drilling mud leftover in the system. Because of the injection process for hydraulic fracturing, the drilling mud and shale experience a wide range of pH, I.S., metal leaching, and long fluid residence times that need to be addressed.

Mineral scale in hydraulic fracturing systems is a known problem in which piping, fracture surfaces, and mineral pores can become occluded reducing flow and overall oil/gas production. One of the most important mineral scales is the mineral barite (barium sulfate). Drilling mud used in the creation of a horizontal well needed for hydraulic fracturing contains 20-60 wt. % barite. Currently, the 15% hydrochloric acid that industry is injecting into the subsurface is reacting with the barite in drilling the mud, which liberates barium and sulfate that can precipitate in less ideal regions of the stimulated rock volume once solution conditions change. Industry is just starting to realize this is a problem but have no method of stopping this from occurring.

What is needed is an acid spearhead formulation for mineral scale reduction that reacts with the well bore within the subsurface barite dissolution temporal phase.

SUMMARY OF THE INVENTION

To address the needs in the art, an acid spearhead formulation for mineral scale reduction that includes a sulfuric acid solution having an acidity that is operationally equivalent to a hydrochloric acid solution in a acid spearhead formulation, with the addition of a sodium citrate compound, where an acid spearhead formulation for mineral scale reduction is formed, where the acid spearhead formulation for mineral scale reduction is disposed in a well bore to stabilize mineral scales, where the acid spearhead formulation for mineral scale reduction is disposed in the well bore to chelate solubilized calcium in a rock bed of the well bore, where the well bore includes a temporal thermodynamic subsurface barite cycling having a subsurface barite dissolution temporal phase, a subsurface barite transport to fractures temporal phase, a subsurface barite precipitation to fracture temporal phase and a subsurface barite dissolution to fracture space temporal phase, where the acid spearhead formulation for mineral scale reduction reacts with the well bore within the subsurface barite dissolution temporal phase.

According to one aspect of the invention, when a mixture of HCl and $H_2SO_4$ having a pH=−0.3 is 100 percent of the HCl, at least 30 percent of the subsurface barite is dissolved to a 0.004 M starting concentration.

According to another aspect of the invention, when a mixture of HCl and $H_2SO_4$ having a pH=−0.3 is 90 percent of the HCl, at least 0.36 percent of the subsurface barite is dissolved to a 0.004 M starting concentration.

In a further aspect of the invention, when a mixture of HCl and H$_2$SO$_4$ having a pH=−0.3 is 80 percent of the HCl, at least 0.17 percent of the subsurface barite is dissolved to a 0.004 M starting concentration.

In yet another aspect of the invention, when a mixture of HCl and H$_2$SO$_4$ having a pH=−0.3 is 70 percent of the HCl, at least 0.11 percent of the subsurface barite is dissolved to a 0.004 M starting concentration.

In another aspect of the invention, when a mixture of HCl and H$_2$SO$_4$ having a pH=−0.3 is 60 percent of the HCl, at least 0.08 percent of the subsurface barite is dissolved to a 0.004 M starting concentration.

According to one aspect of the invention, when a mixture of HCl and H$_2$SO$_4$ having a pH=−0.3 is 50 percent of the HCl, at least 0.06 percent of the subsurface barite is dissolved to a 0.004 M starting concentration.

According to another aspect of the invention, when a mixture of HCl and H$_2$SO$_4$ having a pH=−0.3 is 40 percent of the HCl, at least 0.05 percent of the subsurface barite is dissolved to a 0.004 M starting concentration.

In a further aspect of the invention, when a mixture of HCl and H$_2$SO$_4$ having a pH=−0.3 is 30 percent the HCl, at least 0.04 percent of the subsurface barite is dissolved to a 0.004 M starting concentration.

In one aspect of the invention, when a mixture of HCl and H$_2$SO$_4$ having a pH=−0.3 is 20 percent of the HCl, at least 0.03 percent of the subsurface barite is dissolved to a 0.004 M starting concentration.

According to yet another aspect of the invention, when a mixture of HCl and H$_2$SO$_4$ having a pH=−0.3 is 10 percent of the HCl, at least 0.03 percent of the subsurface barite is dissolved to a 0.004 M starting concentration.

In another aspect of the invention, when a mixture of HCl and H$_2$SO$_4$ having a pH=−0.3 is 0 percent of the HCl, at least 0.02 percent of the subsurface barite is dissolved to a 0.004 M starting concentration.

According to one aspect of the invention, a combination of 0.05 M sodium citrate and carbonate rocks comprising >50 wt. % calcite reduce gypsum formation of CaSO$_4$·2H$_2$O by 90% compared to when no sodium citrate is added.

According to another aspect of the invention, before a new citrate containing solid phase is created the acid spearhead formulation comprises a sodium citrate concentration of up to 1.5 M.

In a further aspect of the invention, the acid spearhead formulation includes a mixture of HCl and H$_2$SO$_4$, where an amount of gypsum precipitation in carbonate rocks is reduced.

DETAILED DESCRIPTION

The current invention provides a novel barite scale mitigation plan, where unlike anti-scaling chemicals (which are highly inefficient) the current invention stabilizes the barite in an ideal location and eliminates barite scale in the stimulated rock volume. Additionally, the current invention does not require industry to alter the weighing agent (barite) added to the drilling mud to prevent well bore blowout at depth.

The current invention relates to a new chemical formulation that stabilizes barite in drilling mud keeping barium and sulfate from being released into solution preventing transport of barium and sulfate into the stimulated rock volume where it will precipitate and severely impact production. In one embodiment, barite is stabilized primarily by the use of sulfuric acid (~6%), at equivalent acidity to 15% hydrochloric acid used in stimulation. Since there is excess sulfate in solution, which can allow for the formation of the mineral gypsum (calcium sulfate) as the mineral calcite dissolves from the shale, sodium citrate is added to the solution in order to chelate any solubilized calcium. Thermodynamic modeling has shown that the mixture of sulfuric acid and sodium citrate will completely inhibit both barite and gypsum in shales with low-carbonate (low-calcite) and high-clay, while completely inhibiting barite formation in high-carbonate/low-clay shale samples. The hydraulic fluid formulation of the current invention still allows for the precipitation of some gypsum in high-carbonate/low-clay shale samples, but the addition of sodium citrate significantly reduces the amount of gypsum formed. According to another embodiment, a mixture of hydrochloric acid and sulfuric acid will further reduce the amount of gypsum precipitated while still stabilizing barite resulting in minimal barite scale precipitation in portions of the stimulated rock volume with low porosity.

These chemical formulations of the current invention can be used by oil and natural gas companies involved in hydraulic fracturing. In a further embodiment, the chemical formulation would be injected into the subsurface at the beginning of a stimulation instead of the 15% hydrochloric acid currently being used.

To assess the impact of Ba in drilling mud on barite scale formation a series of leaching experiments on pure barite and Ba-rich drilling mud under a variety of pH and ionic strength conditions as well as in the presence of organics common in fracture fluid systems (additives, formation water, produced water) and have compared this source of Ba to that releases from four different oil/gas shales are disclosed herein.

In experiments where Ba was leached from various oil/gas shales in the absence of pure barite or Ba-rich drilling mud, the total amount of Ba released (<50% of total Ba) resulted in aqueous Ba concentrations (<400 μg/L) far below levels commonly measured in produced water (>1,000 mg/L). Conversely, the leaching experiments using pure barite or the drilling mud resulted in significant releases of Ba under conditions (low initial pH) that resulted in Ba concentrations closer to those in produced waters. Drilling mud reacted with 15% HCl (similar to that used in the initial acid spearhead) released >18% of the total Ba in the drilling mud (20-60 wt. %) over a 72-hour interval. In this disclosure it was found that, under most chemical conditions, the barite contained in the drilling mud is less stable compared to pure barite, suggesting that drilling mud used in unconventionals is a primary source of Ba in these systems. Because barite is less stable at low pH and high ionic strength, as injected acid is neutralized by the shale (during which both pH and ionic strength increase), a window of time where barite precipitation will occur due to the Ba and $SO_4$ released from the drilling mud and transported into the newly formed fractures prior to cessation of precipitation due to I.S. increasing to over 1 M. This new scale precipitation reduces the newly formed secondary porosity. Disclosed herein is a new acid spearhead formulation for Ba cycling in hydraulic fracturing systems in which drilling mud is an important Ba source resulting in self-inflicted formation damage.

In order to verify that Ba-rich drilling mud is a major source of Ba in hydraulic fracturing systems, a series of Ba-leaching experiments were performed to assess the stability of Ba in drilling mud. The experiments disclosed herein were compared to leaching experiments of four oil/gas shales and pure barite crystals. Besides identifying the likely Ba source in these systems, a variety of chemical treatments, both inorganic parameters (pH and I.S.) and commonly used organic chemicals (additives, formation, produced waters), were compared both to determine which chemical parameter is most responsible for Ba release and to potentially identify at which point during the hydraulic fracturing process release is likely to occur. Based on these results, a new acid spearhead formulation for mineral scale reduction for Ba cycling in hydraulic fracturing systems is provided.

Turning now to the reactor experiments, for determining potential Ba sources, a total of six types of solids/slurries (4 shales, pure barite, and drilling mud slurry) were selected for reaction with various chemical treatments. The four shale samples (Eagle Ford, Green River, Barnett, and Marcellus) contain a wide range of carbonate, clay, and organic concentrations along with wide ranges in Ba concentrations. A pure barite sample was selected from the Stanford Research Mineral Collection as a control while the drilling mud (DM) used was procured from National Energy Technology Laboratory which was used during the installation of the MSEEL site in Morgantown, W. Va. All solid samples were ground to a particle size of 150-250 μm in order to speed up reaction and allow a more uniform comparison in which shale porosity/permeability was less of a factor.

The experimental design differed between reactors containing shale and reactors containing either pure barite or drilling mud. Barium results for the shale reactors are a subset of data, from earlier experiments. In these reactors, 1 g of ground shale was reacted, unagitated, for a total of 3-weeks at 80° C. in 200 mL of fluid with ~40 mL of headspace (headspace was at equilibrium with environment before sealing. All experiments were conducted in acid washed borosilicate serum bottles with butyl rubber stoppers and aluminum crimp seals. Fluid sampling was done every three days with samples being filtered through 20 nm Anatop® filters and preserved with trace metal grade 2% $HNO_3$. In reactors using either pure barite or drilling mud, 0.1 g of pure barite or 0.2 g of drilling mud slurry were reacted in a 40 mL I-Chem® borosilicate vials with Teflon® lined lids. The larger amount of drilling mud was selected in order to have similar concentrations of barite in the vials. The MSDS for the drilling mud states that barite concentrations are between 20 and 60 wt. %. Organic and inorganic parameters (Table 1) tested for the barite and drilling mud are consistent with values found in fracture fluid formulations and produced/flowback waters. Barite/DM reactors were placed on an end-over-end tumbler at 70 rpm for agitation at 80° C. for 72 hours. Preliminary testing showed that in all cases Ba concentrations reached steady state by 72 hours. Samples were filtered through 20 nm Anatop® filters and immediately diluted 1:100 with trace metal grade 10% $HNO_3$, in order to prevent any Ba from precipitating as temperature dropped. Barium concentrations for both the shale reactors and the Barite/DM reactors were measured using a Fisher Scientific iCAP 6300 ICP-OES.

Regarding the bulk shale, barite, drilling parameters, drilling mud slurry was separated into its solid and liquid components by centrifugation at 12,200 rpm for 4 hours. The supernatant was removed and was serially filtered using a 0.45 μm GMF filtered followed by a 0.2 μm PES filter and diluted 1:1000 using 2% trace metal grade $HNO_3$. Though the supernatant was pre-filtered to 0.2 μm, the solution was not able to pass through the alumina matrix of the 20 nm Anatop® filters. The pellet was washed with double deionized water (DDI) and dried at 80° C. For comparison, a subset of the drilling mud slurry was dried at 80° C. without any prior separation. Dried pellet samples of the shales (before and after reaction), both drilling muds, and barite were analyzed using a Rigaku Microflex X-ray diffractometer. Analyses of collected diffractograms were conducted using the JADE diffraction analysis program where the first five most intense phases were fit with reference diffraction patterns from the National Institute of Standards and Technology (NIST) database followed by least-square fitting of the data to quantify wt. % of detected mineral phases. Bulk elemental analysis of all solids was completed using a Spectro Analytical XRF model XEPOS HE with an additional certified reference standard (Montana Soil 2711a). Total metal/anions in the filtered DM fluid was analyzed using Fisher Scientific XSeries 2 ICP-MS.

TABLE 1

Inorganic and organic parameters tested. Ionic strength (I.S.) was set using NaCl and titrated to pH = 7 using NaOH. Organic chemical concentrations are set to literature values. Fracture fluid recipe is similar to that used in NETL's Greene Co. Well E and has been used in previous experiments. Type of solids: Barite (B), Drilling Mud (DM), Shale (S). All parameters for shale have reactors containing one of the following: Eagle Ford, Green River, Barnett, or Marcellus.

| Chemical parameter | Use/Source | Solids tested |
|---|---|---|
| 15% HCl (pH = −0.3) | Initial acid slug following perforation | B, DM |
| pH 2 | | B, S |
| pH 4 | | B, DM, S |
| pH 5 | | B |
| pH 7 | | B, DM, S |
| I.S. 0.01 | | B, DM |
| I.S. 0.1 | | B, DM |
| I.S. 2.3 | | B, DM |
| Citrate | Fe-control | B |
| Guar Gum | Gellant | B |
| Ethylene Glycol | Winterizing agent, scale control | B, DM |
| Glutaraldehyde | Biocide | B, DM |
| Polyethylene glycol | Biocide | B, DM |
| Bitumen (Marcellus-derived) | Native to shale | B |
| Acetate | Formation water | B, DM |
| Benzene | Produced water | B |

TABLE 1-continued

Inorganic and organic parameters tested. Ionic strength (I.S.) was set using NaCl and titrated to pH = 7 using NaOH. Organic chemical concentrations are set to literature values. Fracture fluid recipe is similar to that used in NETL's Greene Co. Well E and has been used in previous experiments. Type of solids: Barite (B), Drilling Mud (DM), Shale (S). All parameters for shale have reactors containing one of the following: Eagle Ford, Green River, Barnett, or Marcellus.

| Chemical parameter | Use/Source | Solids tested |
|---|---|---|
| Kerosene | Friction reducer | B |
| Methanol | Fe-control, surfactant | B, DM |
| Fracture fluid | | B, DM |

For the results of the bulk shale and drilling mud characterization, the bulk mineralogy of the four shale samples used in these experiments have been described previously and is presented in Table 2. Two shale samples contained >50 wt. % carbonates (Eagle Ford and Green River), while the two clay-rich samples (Barnett and Marcellus) had <12 wt. % carbonates (Table 2). Bulk XRF analyses of these four shales show a wide range of total Ba with Eagle Ford containing the least, followed by Barnett, Green River, and Marcellus (Table 3). For the drilling mud, XRD analysis of the DM that was dried without any prior separation shows a significant amount of NaCl that precipitated during the drying process (>90 wt. %) with the remaining portion being barite (Table 4). When the DM was separated from the carrier fluid via centrifugation, the amount of detectable NaCl dropped to 24 wt. % allowing for the detection of other mineral species (Table 4). The large concentration of Na and Cl in the carrier fluid was confirmed by ICP-MS with Na concentrations being 121.8 g/L and Cl concentrations being 192.3 g/L. XRF data of the drilling mud with and without fluid separation confirms that mechanically separating the solid and liquid portions resulted in a large decrease of Cl when the samples were dried (Table 5). Assuming that all the Ba in the drilling mud is in the form of barite, the calculated barite concentration using the XRF data results in 20.1 wt. % barite which is in good agreement with the quantitative XRD results.

TABLE 2

Bulk mineralogy of Eagle Ford, Green River, Barnett, and Marcellus shale samples before reaction with fracture fluid.

| | Quartz | Calcite | Dolomite | Illite | Kaolinite | Pyrite | Feldspar | Analcime |
|---|---|---|---|---|---|---|---|---|
| Eagle Ford | 25.2 | 64.5 | X | X | 7.6 | 2.7 | X | X |
| Green River | 31.4 | 23.2 | 28.9 | X | X | X | 8.0 | 8.5 |
| Barnett | 44.2 | 8.2 | X | 40.6 | X | 2.1 | 4.9 | X |
| Marcellus | 42.2 | 11.6 | 1.1 | 35.0 | X | 6.4 | 3.7 | X |

"X" denotes non-detectable phase.

TABLE 3

Selected XRF data for Eagle Ford (EF), Green River (GR), Barnett (B), and Marcellus (M) shales before and after 3-week reaction with fracture fluid.

| | EF Unreacted | EF Reacted | GR Unreacted | GR Reacted | B Unreacted | B Reacted | M Unreacted | M Reacted |
|---|---|---|---|---|---|---|---|---|
| Ca (wt. %) | 16.67 | 13.46 | 13.64 | 9.11 | 2.51 | 0.14 | 4.23 | 0.07 |
| Mg (wt. %) | 0.37 | 0.47 | 4.41 | 3.7 | 0.63 | 0.35 | 0.78 | 0.47 |
| Al (wt. %) | 5.82 | 6.38 | 2.66 | 2.76 | 7.29 | 7.67 | 10.5 | 7.07 |
| S (wt. %) | 1.13 | 1.19 | 0.1 | 0.07 | 0.9 | 1.1 | 2.05 | 1.73 |
| Fe (mg/kg) | 23930 | 21170 | 17830 | 13610 | 24830 | 20790 | 45630 | 32540 |
| Ba (ppm) | 104.8 | <1.5 | 1188 | 1094 | 518 | 215.7 | 1675 | 898 |

| | Ba (mg/kg) |
|---|---|
| M Unreacted | 1675 |
| M Reacted | 898 |
| M DDI Water | 1847 |
| M HCl Only | 832.9 |
| M Fracture Fluid, No HCl | 2203 |

TABLE 4

Quantitative XRD results of Dried drilling mud (no separation of solid and liquid prior to drying) and Centrifuged and dried drilling mud.

| | Species | Weight % |
|---|---|---|
| Dried Drilling Mud | Halite | 90.9 |
| | Barite | 9.1 |
| Centrifuged and dried Drilling Mud | Halite | 24.0 |
| | Barite | 24.4 |
| | Illite | 44.0 |
| | Calcite | 7.6 |

TABLE 5

Selected XRF data of Dried drilling mud (no separation of solid and liquid prior to drying) and Centrifuged and dried drilling mud.

| | Dried drilling mud | Centrifuged and dried drilling mud |
|---|---|---|
| Al (%) | 3.62 | 1.43 |
| Si (%) | 9.03 | 6.23 |
| S (%) | 2.33 | 2.33 |
| Cl (%) | 16.22 | 1.34 |
| Fe (mg/kg) | 8517 | 8779 |
| Br (mg/kg) | 371.7 | 56.7 |
| Cs (mg/kg) | 168.2 | 153.8 |
| Ba (mg/kg) | 111400 | 112100 |

Figure 1:
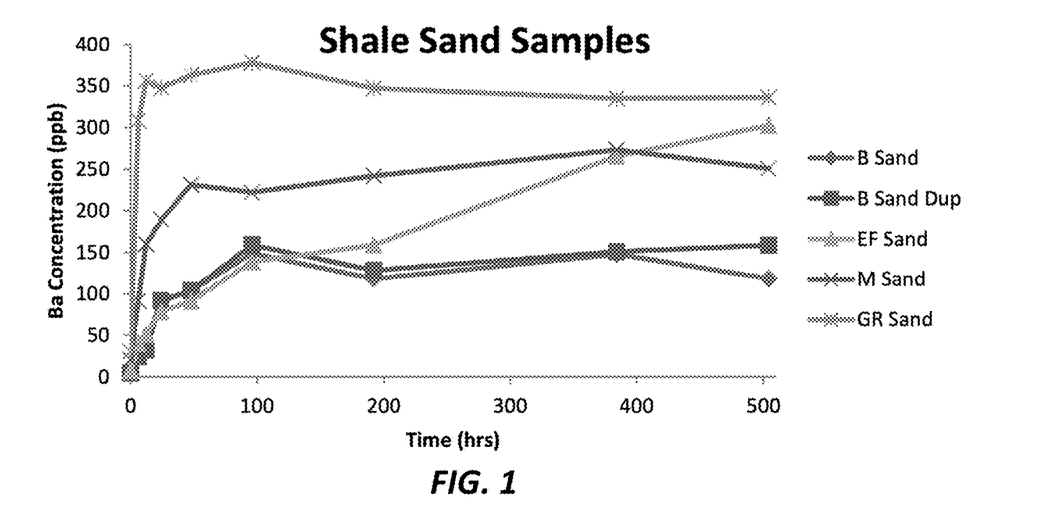
FIG. 1 shows barium release from ground shale samples (150-250 μm) in the presence of pH=2 fracture fluid. B=Barnett, EF=Eagle Ford, M=Marcellus, and GR=Green River. Measurement error for triplicate measurements is <8%, according to the current invention.
Figure 2:
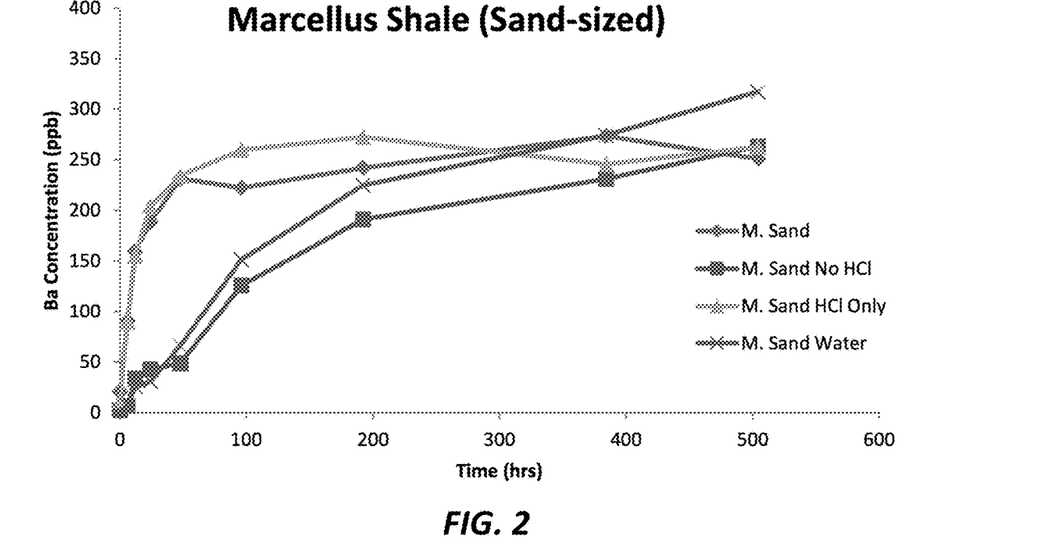
FIG. 2 shows barium release from ground Marcellus shale in the presence of fracture fluid, fracture fluid minus HCl, HCl only, and DDI Water only, wherein the measurement error for triplicate measurements is <8%, according to the current invention.

The release of Ba in the shale reactors for Barnett, Green River, and Marcellus shales reached a plateau within the first 100 hours of experimentation while Eagle Ford continued to increase throughout the experimental time (FIG. 1). The concentrations of released Ba in these reactors are more than 3-orders of magnitude below that typically found in produced/flowback water (typically 1,000 ppm). Of particular interest is the Ba release for the Marcellus shale with and without the addition of HCl in the fluid. As seen in FIG. 2, in a reactor containing HCl only, the rapid increase of Ba in solution mirrors the case where all the organic additives and HCl are included. In reactors without any added HCl (pH=7), the release of Ba is slower than the pH=2 scenario, but within the 3-week time frame, it reaches concentrations similar to the pH=2 reactors.

Bulk XRF of the shale sands post-experiment have definite trends. In the case of Barnett, Eagle Ford, and Marcellus shales samples, nearly 50% of the total Ba (nearly 100% for Eagle Ford) in the sample was lost during the 3-week reaction (Table 3). The maximum Ba release of ~50% of the total for Marcellus is consistent with prior results. Even though Green River shale had the highest concentration of Ba in solution throughout the experiments, the overall Ba weight percentage in the shale did not reduce nearly as much as the other three shale types (Table 3). Based on the XRF data, the Barnett and Marcellus shales lost the largest amount of Ba, but the Barnett also showed the lowest amount of Ba in solution. If the solution concentrations were proportional to the solid concentrations, then Ba concentration in solution for Eagle Ford, Barnett, and Marcellus should be nearly 8-fold higher than their present values. As previously shown for these shale samples, pyrite readily oxidizes under these fracture fluid conditions. The oxidation of S from the pyrite provides a source of $SO_4$ which due to the low solubility of barite could allow for barite precipitation to occur, reducing overall Ba concentrations in solution. In these shale systems, pH is the largest driver for rapid Ba release into solution. The Marcellus samples show that when the starting solution pH is low (pH=2), Ba is rapidly released into solution (FIG. 2). This rapid Ba release, steady state is reached in <100 hours, occurs with and without the organic additives. These solution data are consistent with the bulk XRF data where the reactors with added HCl showed a large and consistent drop in Ba concentration, ~45-50% (Table 3).

Turning now to the barium release from pure barite and drilling mud slurry, pure ground barite (150-250 μm) was used to set a baseline for the thermodynamic stability of barite in a variety of inorganic and organic conditions. The inorganic parameters, pH and I.S. had a significant effect on the total amount of Ba released into solution (Table 6). The more acidic the solution, the greater release of Ba from the ground barite with 88.8 ppm at conditions similar to the 15% HCl acid spearhead injected prior to the rest of the completion chemicals. Thermodynamic modeling of the pH effects on barite using Visual Minteq are in good agreement with experimental values except for pH=0, in which modeling predicts 147 ppm rather than the 88.8 ppm measured. The pH 7 reactor is taken as a baseline for comparing dissolution of barite at various I.S. or in the presence of various organic constituents. In Table 6, the vast majority of organics were found to slightly thermodynamically stabilize the barite with Ba concentrations at the same level as the control to 0.7 ppm below. A few organics were seen to slightly enhance barite solubility (glutaraldehyde and acetate). The fracture fluid released over 4 times as much Ba compared to the pH 7 control. Additionally, acidic fracture fluid released even more Ba when compared to the pH=7 reactor, which the majority of released Ba can be attributed to acidity rather than the presence of organic additives (Table 6). But since the released Ba concentrations are higher than that of the pH=2 reactors, the organics are aiding in solubilizing the barite, i.e., after dissolution has occurred.

TABLE 6

Barium release from pure barite in the presence of a variety of inorganic and organic parameters. Measurement error for triplicate measurements <5%.

| Parameter | Ba released (ppm) | Parameter | Ba Released (ppm) |
|---|---|---|---|
| pH 0 | 88.8 | Citrate | 1.5 |
| pH 2 | 7.5 | Guar Gum | 1.6 |
| pH 4 | 2.2 | Ethylene Glycol | 1.3 |
| pH 5 | 1.99 | Glutaraldehyde | 3.4 |
| pH 7 (DDI water) | 2.0 | Polyethylene glycol | 1.8 |
| I.S. 0.6 mM | 2.0 | Marcellus Bitumen | 1.8 |
| I.S. 0.01M | 2.8 | Acetate | 2.3 |
| I.S. 0.1M | 5.1 | Benzene | 1.8 |
| I.S. 1M | 13.9 | Methanol | 2.1 |
| I.S. 2.3M | 22.2 | Fracture Fluid | 9.4 |
| | | DDI water | 2.0 |

Due to the difference in the total amount of Ba added to reactors between experiments using pure barite and drilling mud slurry, it is more useful to look at the total percentage of Ba released from the amount of Ba-solid added. As seen in Table 7, pH is the largest driver of Ba release from both the DM and the pure Barite. At very low pH as seen with the initial 15% HCl spearhead commonly injected at the beginning of stimulation, over 18% of the total Ba contained in the DM was released into solution. At low pH more than twice as much Ba is released from the DM compared to pure Barite. The percentage of Ba released from both types of materials for various I.S. is similar over a wide range of salinity. The organics on the other hand does show definite differences in Ba release from DM and Barite based on the additive (Table 7). Several organics released similar amount of Ba into solution for both materials: glutaraldehyde, polyethylene glycol, acetate, and methanol. These organics released similar amounts of Ba when compared to DDI water controls (pH=7). Of the all the single type organics tested, ethylene glycol, a common winterizing-agent and scale inhibitor, released significantly more Ba from DM compared to barite. Surprisingly, ethylene glycol released more Ba from DM compared to DDI water (pH=7), but released less from pure Barite when compared to the DDI water control. Fracture fluid (pH=2), released more Ba from both materials than the pH=2 reactor suggesting that the organic additives behave differently (i.e., promote dissolution) when mixed together or at lower pH.

TABLE 7

Percentage of total Ba added to reactors either in the form of Drilling Mud or pure Barite in the presence of various inorganic and organic parameters.

|  | % Ba released from Drilling Mud | % Ba released from pure Barite |
|---|---|---|
| pH 0 | 18.4 | 6.0 |
| pH 2 | 0.44 | 0.39 |
| pH 4 | 0.18 | 0.15 |
| pH 7 | 0.2 | 0.14 |
| I.S. 0.01 | 0.16 | 0.19 |
| I.S. 0.1 | 0.3 | 0.35 |
| I.S. 1 | 0.91 | 0.95 |
| I.S. 2.3 | 1.54 | 1.51 |
| Ethylene glycol | 0.33 | 0.09 |
| Glutaraldehyde | 0.2 | 0.23 |
| Polyethylene glycol | 0.15 | 0.12 |
| Acetate | 0.17 | 0.16 |
| Methanol | 0.15 | 0.14 |
| Ammonium persulfate | 0.03 | 0.01 |
| Fracture fluid (pH = 2) | 0.55 | 0.64 |

There are at least two major potential sources of Ba in hydraulic fracturing systems: source rock and drilling mud. The amount of Ba native to the oil/gas shales can vary significantly depending not only on the different shale play, but within the shale play itself. Analyses of 4 different shale samples (Eagle Ford, Green River, Barnett, and Marcellus) show that Ba concentrations can vary by over an order of magnitude (Table 3). Even though Ba concentrations in the shale can reach levels of 1000 mg/kg or more (assumed to predominantly bound to clays), these levels are significantly lower than those in DM which can vary from 20-60 wt. % barite depending on the manufacturer. Though there are instances in unconventional systems where there are lenses of nearly pure barite present, the high consistency of Ba in produced waters over a variety of plays casts doubt that these barite lenses would be a large contributor of barite in these systems. The consistency of Ba concentration in produced waters also casts doubt on the shale (excluding the barite lenses) being the primary source of Ba into the fluid system. As seen in Table 3 and FIGS. 1-2, besides the Eagle Ford samples, a significant amount of the Ba (>40%) is still contained in the rock after reaction. Based on the amount of Ba in rock and the total amount of Ba that can be released from the shale, the amount of extractable Ba from the source rock seems unlikely to produce the Ba concentrations detected in produced waters. This suggests another Ba source is more important in these systems.

Drilling mud common to oil/gas systems, both conventional and unconventional, contains a significant amount of Ba (20-60 wt. %). These concentrations are over 2-orders of magnitude greater than the higher end of Ba concentrations in the shales tested (Table 3). Even though operators in unconventional systems attempt to clean the bore hole as much as possible prior to injection of chemicals, the ability to remove all the DM from the system due to embedment in the bore wall (either on the surface or pushed into newly formed cracks due to the drilling process) is not possible. Because of the high concentration of barite in the drilling mud compared to that of the source rock, dissolution of even a small fraction of the barite in the DM will result in solution Ba concentrations significantly higher than derived from the shale. Additionally, since the DM resides in the vicinity of the bore hole, it is more accessible to fluids than the shale matrix, which is accessible only when fluids imbibe into the shale.

As shown with the shale, barite, and DM reactors, low pH in the form of HCl is the most important parameter with regards to the stability of Ba in both pure crystals and DM. The next important variable in these systems is I.S. Because the DM contains significant quantities of Na and Cl in the carrier fluid as indicated by the amount that precipitates when dried and ICP-MS data, this additional I.S. results in enhanced dissolution of barite in the DM as seen at low pH (Table 7), due to the lowering of the activity coefficients for Ba and $SO_4$. Organics additives on their own in these systems appear to have little impact on the stability of barite, both pure and in DM, when compared to pH and I.S. In the case of the fracture fluid (pH=2), there is an enhancement in Ba release from both barite and DM when compared to the pH=2 reactor (Table 7). This is due most likely to the presence of the gellant guar gum in the fracture fluid. Guar gum has a high chelating potential and should bind Ba released in solution, which could lead to additional barite dissolution due to the low pH of the fluid. Based on the higher I.S. of the DM experiment it could be predicted that the DM reactor should release more Ba than the pure barite system. Though great care was taken to homogenize the fracture fluid prior use in the reaction vessels, due to guar gum not fully dissolving into solution, there is a high possibility that there is a variation in guar gum concentrations in these reactors. In the case of fracture fluid, organics (presumably guar gum) enhances the dissolution of barite at low pH. Even though the organics aid in dissolution, the other experiments conclusively show that pH is the most important variable for solubilizing Ba and $SO_4$ from drilling mud.

Figure 3:
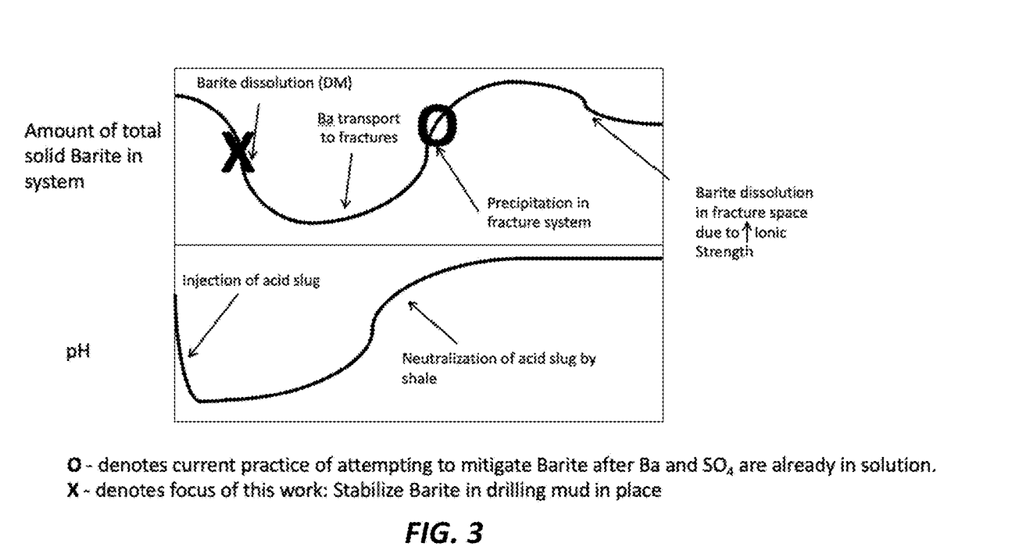
FIG. 3 shows a schematic drawing of Ba cycling in the subsurface of hydraulic fracturing systems, according to one embodiment of the invention.

In general practice, 15% HCl is injected into the subsurface prior to injection of additional chemicals and proppant. Results shown in Tables 6 and 7 shows that significant quantities of Ba, along with $SO_4$, are released into solution. This released Ba and $SO_4$ would then be pushed into the newly formed fractures in the shale by later injection stages where it can precipitate when injected acid is neutralized by carbonates in the shale raising the solution pH. Though I.S. is shown to have an effect on barite stability (Tables 6 and 7), and precipitation, its effect is much less than that of pH, especially over the short time scale in which pH is very low (pH<0). Though the changes in I.S. in the subsurface during injection, shut-in, and production is not fully understood, since I.S. is controlled by mineral dissolution it can be assumed that unless highly saline base fluid is used, the I.S. will slowly rise during shut-in and be inversely related to solution acidity. The current invention provides a new schematic for barite cycling that takes into account the pH and I.S. (FIG. 3). During the initial injection of 15% HCl, a significant amount of Ba and $SO_4$ in drilling mud that comes into contact with the acid will be liberated. This newly released Ba and $SO_4$ will then be forced into the newly formed fractures by the injection of later stages. As the acid reacts with carbonate in the rocks and mixes with formation water, solution pH will begin to increase. Once the pH rises above pH=2, barite will begin to precipitate. As the injected acid reacts with minerals in the shale (carbonates, pyrite, clays, etc.) I.S. will increase. Until solution I.S. reaches ~1 M, barite will continue to precipitate from solution. This interplay between acidity and I.S. allows for a window of time for barite precipitation to occur before I.S. gets too high inhibiting further precipitation and eventually dissolving a fraction of the newly precipitated barite. Thermodynamic modeling of results presented in Table 6 indicate that ~10% of barite that would precipitate in fractures once pH>2 would dissolve. The disclosed model and data show that barite scale on fracture surfaces and in shale pores in these systems is derived from the dissolution of drilling mud and its interaction with the 15% HCl acid spearhead.

According to the current invention, pH is one of the most important parameters in hydraulic fracturing systems. In the case of Ba present in oil/gas shale, low pH solutions will result in the release of Ba into solution. Though up to 50% of the total Ba contained in the shale can be released into solution, the total amount of Ba is not sufficient to explain the high concentrations of Ba measured in produced water. Ba-infused drilling mud contains extremely high concentrations of barite (20-60 wt. %). Dissolving a low percentage of the barite in leftover drilling mud (~8%) should be sufficient to explain the high concentrations of Ba in produced water. The current invention provides highly acidic solutions such as the 15% HCl acid spearhead initially injected into the subsurface can release >18% of the total Ba contained in drilling mud. Based on the details disclosed herein, a new model for Ba cycling in the subsurface in which the DM is the primary source of Ba for barite scale production in the newly formed fracture network. Due to the competing trends of pH and I.S. in these systems, a window of barite precipitation will occur in the subsurface once pH>2 and I.S.<1 M. Even if I.S. rises to >1 M, only a fraction of the precipitated barite will re-dissolve. The end result is self-inflicted formation damage caused by the use of Ba-rich DM and a highly acidic acid spearhead.

Acid spearhead formulation for mineral scale reduction that includes a sulfuric acid solution having an acidity that is operationally equivalent to a hydrochloric acid solution in a acid spearhead formulation, including a sodium citrate compound, where an acid spearhead formulation for mineral scale reduction is formed, where the acid spearhead formulation for mineral scale reduction is disposed in a well bore to stabilize mineral scales, where the acid spearhead formulation for mineral scale reduction is disposed in the well bore to chelate solubilized calcium in a rock bed of the well bore, where the well bore includes a temporal thermodynamic subsurface barite cycling having a subsurface barite dissolution temporal phase, a subsurface barite transport to fractures temporal phase, a subsurface barite precipitation to fracture temporal phase and a subsurface barite dissolution to fracture space temporal phase, where the acid spearhead formulation for mineral scale reduction reacts with the well bore within the subsurface barite dissolution temporal phase.

Figure 4:
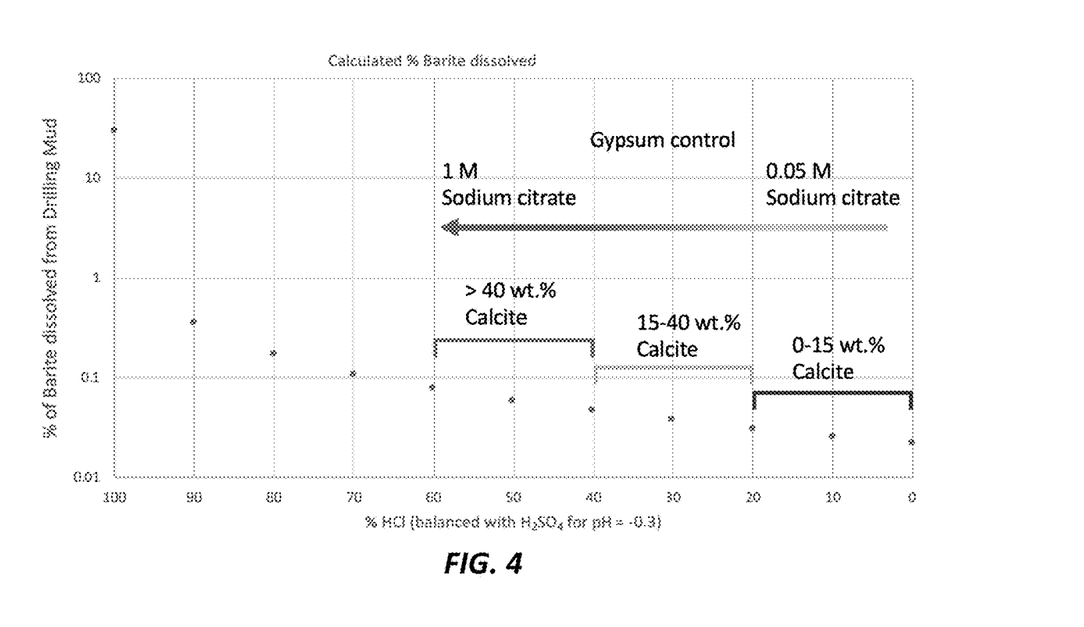
FIG. 4 shows a chart of shales with different concentrations of sodium citrate to control both dissolution of barite from drilling mud and the precipitation of gypsum due to excess sulfate, according to the current invention.

FIG. 4 shows a chart of shales with different concentrations of calcite to control precipitation of gypsum due to excess sulfate, according to the current invention. As shown, when a mixture of HCl and $H_2SO_4$ having a pH=−0.3 is 100 percent of the HCl, at least 30 percent of the subsurface barite is dissolved to a 0.004 M starting concentration, and when a mixture of HCl and $H_2SO_4$ having a pH=−0.3 is 90 percent of the HCl, at least 0.36 percent of the subsurface barite is dissolved to a 0.004 M starting concentration. Further, when a mixture of HCl and $H_2SO_4$ having a pH=−0.3 is 80 percent of the HCl, at least 0.17 percent of the subsurface barite is dissolved to a 0.004 M starting concentration, and when a mixture of HCl and $H_2SO_4$ having a pH=−0.3 is 70 percent of the HCl, at least 0.11 percent of the subsurface barite is dissolved to a 0.004 M starting concentration. As also shown, when a mixture of HCl and $H_2SO_4$ having a pH=−0.3 is 60 percent of the HCl, at least 0.08 percent of the subsurface barite is dissolved to a 0.004 M starting concentration, and, when a mixture of HCl and $H_2SO_4$ having a pH=−0.3 is 50 percent of the HCl, at least 0.06 percent of the subsurface barite is dissolved to a 0.004 M starting concentration. The chart addresses additional concentration scenarios, that include, when a mixture of HCl and $H_2SO_4$ having a pH=−0.3 is 40 percent of the HCl, at least 0.05 percent of the subsurface barite is dissolved to a 0.004 M starting concentration, when a mixture of HCl and $H_2SO_4$ having a pH=−0.3 is 30 percent the HCl, at least 0.04 percent of the subsurface barite is dissolved to a 0.004 M starting concentration, when a mixture of HCl and $H_2SO_4$ having a pH=−0.3 is 20 percent of the HCl, at least 0.03 percent of the subsurface barite is dissolved to a 0.004 M starting concentration, when a mixture of HCl and $H_2SO_4$ having a pH=−0.3 is 10 percent of the HCl, at least 0.03 percent of the subsurface barite is dissolved to a 0.004 M starting concentration, and when a mixture of HCl and $H_2SO_4$ having a pH=−0.3 is 0 percent of the HCl, at least 0.02 percent of the subsurface barite is dissolved to a 0.004 M starting concentration. It is understood that these isolated parameters listed are instances in the continuous curve shown in FIG. 4.

Figure 5:
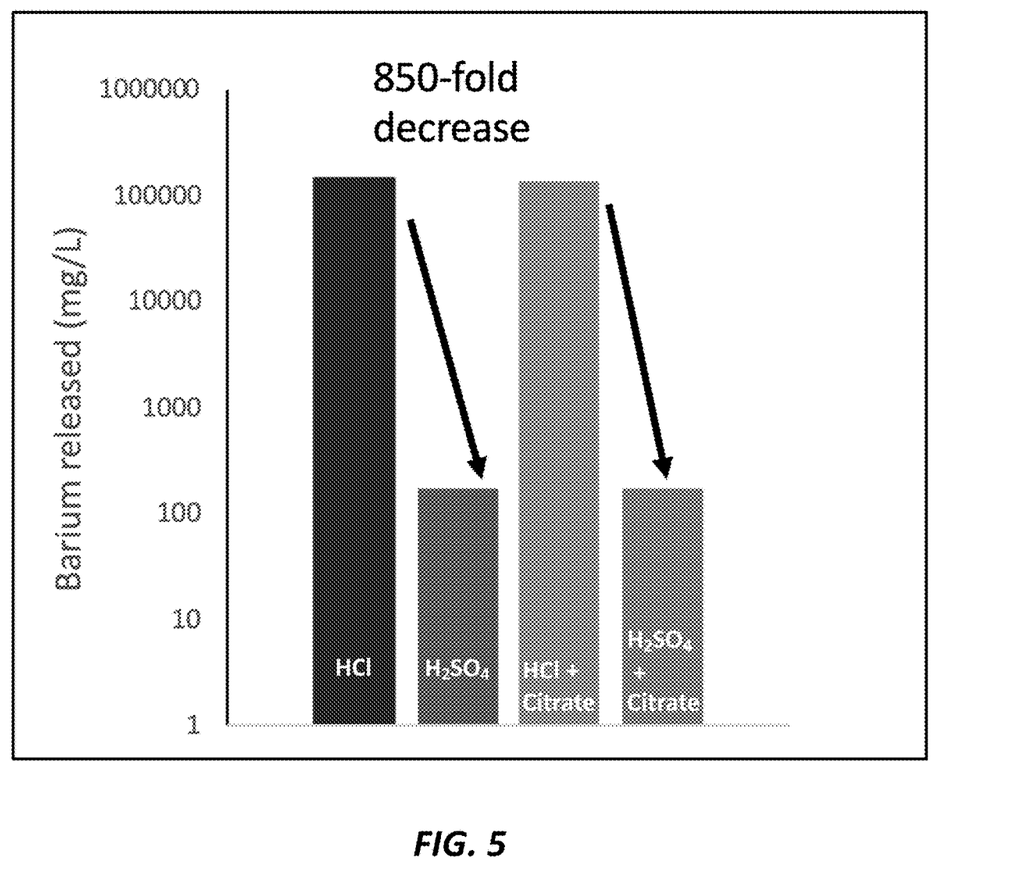
FIG. 5 is a chart that shows significant reduction in total Ba$^2$ and SO$_4^{2-}$ when sulfuric acid is used, where the addition of citrate did not result in additional Ba release, and the results of barium released from drilling mud by HCl: 149,000 mg/L, and barium released from drilling mud by H$_2$SO$_4$: 170 mg/L, according to the current invention.

FIG. 5 is a chart that shows significant reduction in total $Ba^2$ and $SO_4^{2-}$ when sulfuric acid is used, where the addition of citrate did not result in additional Ba release, and the results of barium released from drilling mud by HCl: 149,000 mg/L, and barium released from drilling mud by $H_2SO_4$: 170 mg/L, according to the current invention.

According to one aspect of the invention, a combination of 0.05 M sodium citrate and carbonate rocks comprising >50 wt. % calcite reduce gypsum formation of $CaSO_4 \cdot 2H_2O$ by 90% compared to when no sodium citrate is added.

According to another aspect of the invention, before a new citrate containing solid phase is created the acid spearhead formulation comprises a sodium citrate concentration of up to 1.5 M.

In a further aspect of the invention, the acid spearhead formulation includes a mixture of HCl and $H_2SO_4$, where an amount of gypsum precipitation in carbonate rocks is reduced.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, high-clay systems with minimal calcite present will benefit from the use of more sulfuric acid and less sodium citrate while high-carbonate systems (>50 wt. %) will require HCl/$H_2SO_4$ mixtures with increasing levels of sodium citrate to mitigate gypsum formation. FIG. 4 illustrates the flexibility of this approach with generalized guidelines for HCl/$H_2SO_4$ mixtures along with ranges of sodium citrate to be added for various calcite concentrations.

All such variations are considered to be within the scope and spirit of the present invention as defined by the following claims and their legal equivalents.

What is claimed:

1. A method to mitigate barite scale precipitation in unconventional oil/gas extraction, the method comprising:
    preparing an acid spearhead formulation having as its acid either sulfuric acid or a mixture of sulfuric acid and hydrochloric acid that is 10% or more sulfuric acid, wherein the acid spearhead formulation includes sodium citrate in an amount effective to suppress gypsum formation; and
    injecting the acid spearhead formulation into a subsurface.

2. The method of claim 1, wherein the mixture of sulfuric acid and hydrochloric acid is between 40% and 60% sulfuric acid.

3. The method of claim 2, wherein a concentration of the sodium citrate in the acid spearhead formulation is about 1 M, whereby gypsum formation from subsurface rock having 40% or more calcite by weight is alleviated.

4. The method of claim 1, wherein the mixture of sulfuric acid and hydrochloric acid is between 60% and 80% sulfuric acid.

5. The method of claim 4, wherein a concentration of the sodium citrate in the acid spearhead formulation is between about 0.05 M and about 1 M, whereby gypsum formation from subsurface rock having 15-40% calcite by weight is alleviated.

6. The method of claim 1, wherein the mixture of sulfuric acid and hydrochloric acid is 80% or more sulfuric acid.

7. The method of claim 6, wherein a concentration of the sodium citrate in the acid spearhead formulation is about 0.05 M, whereby gypsum formation from subsurface rock having 0-15% calcite by weight is alleviated.

* * * * *